United States Patent
Pfadler (10) Patent No.: US 11,632,276 B2
(45) Date of Patent: Apr. 18, 2023

(54) ADAPTIVE TRANSMITTER SYMBOL ARRANGEMENT FOR OTFS CHANNEL ESTIMATION IN THE DELAY-DOPPLER DOMAIN

(71) Applicant: VOLKSWAGEN AKTIENGESELLSCHAFT, Wolfsburg (DE)

(72) Inventor: Andreas Pfadler, Berlin (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 17/623,912

(22) PCT Filed: Jun. 26, 2020

(86) PCT No.: PCT/EP2020/068063
§ 371 (c)(1),
(2) Date: Dec. 30, 2021

(87) PCT Pub. No.: WO2021/001278
PCT Pub. Date: Jan. 7, 2021

(65) Prior Publication Data
US 2022/0368582 A1  Nov. 17, 2022

(30) Foreign Application Priority Data
Jul. 4, 2019 (EP) .................................... 19184349

(51) Int. Cl.
*H04L 27/26* (2006.01)
(52) U.S. Cl.
CPC ...... *H04L 27/2602* (2013.01); *H04L 27/2639* (2013.01)
(58) Field of Classification Search
CPC . H04L 27/2602; H04L 5/0051; H04L 5/0048; H04L 5/0023; H04L 27/2605; H04L 27/2639
See application file for complete search history.

(56) References Cited

U.S. PATENT DOCUMENTS

| | | |
|---|---|---|
| 7,149,205 B2 | 12/2006 | Nakamura et al. |
| 10,666,314 B2 | 5/2020 | Hadani et al. |

(Continued)

FOREIGN PATENT DOCUMENTS

| | | |
|---|---|---|
| CN | 109348739 A | 2/2019 |
| JP | 2001069110 A | 3/2001 |

(Continued)

OTHER PUBLICATIONS

Raviteja et al.; Embedded Pilot-Aided Channel Estimation for OTFS in Delay-Doppler Channels; Arxiv.org; Cornell University Library; Aug. 25, 2018; pp. 1-9.

(Continued)

*Primary Examiner* — Khanh C Tran
(74) *Attorney, Agent, or Firm* — Barnes & Thornburg, LLP (57) ABSTRACT

A method for adaptive transmitter symbol arrangement in delay-Doppler domain grids including retrieving one or more current communication relevant parameters; deriving from the one or more current communication relevant parameters at least a maximum expected Doppler frequency shift for a transmitted signal; placing at least one pilot symbol in a delay-Doppler domain grid; placing a minimum number of guard symbols around the at least one pilot symbol in the delay-Doppler domain grid so the guard symbols occupy a guard space around the at least one pilot so any grid position outside the guard space around the at least one pilot has a distance along the first grid direction exceeding the derived first guard space parameter and also has a distance along the second grid direction that exceeds the second guard space parameter; and placing data symbols in the delay-Doppler domain grid outside the guard space for data transmission.

22 Claims, 4 Drawing Sheets

(56) References Cited

U.S. PATENT DOCUMENTS

| | | | |
|---|---|---|---|
| 2018/0205481 A1* | 7/2018 | Shlomo | H04J 11/00 |
| 2019/0058616 A1 | 2/2019 | Matsuda et al. | |
| 2019/0379422 A1 | 12/2019 | Hadani et al. | |
| 2020/0389268 A1* | 12/2020 | Sathyanarayan | H04L 27/0008 |
| 2021/0111786 A1* | 4/2021 | Pfadler | H04L 27/26885 |
| 2021/0111844 A1* | 4/2021 | Pfadler | H04L 5/0023 |
| 2022/0393921 A1* | 12/2022 | Pfadler | H04L 25/0224 |

FOREIGN PATENT DOCUMENTS

| | | | |
|---|---|---|---|
| JP | 2002353878 A | 12/2002 | |
| WO | 2017044660 A1 | 3/2017 | |
| WO | 2017147439 A1 | 8/2017 | |

OTHER PUBLICATIONS

Raviteja et al.; Embedded Delay-Doppler Channel Estimation for Orthogonal Time Frequency Space Modulation; 2018 IEEE 88th Vehicular Technology Conference (VTC-FALL); Aug. 27, 2018; pp. 1-5.

Raviteja et al.; Embedded Pilot-Aided Channel Estimation for OTFS in Delay-Doppler Channels; IEEE Transactions on Vehicular Technology; May 1, 2019; vol. 68, No. 5; pp. 4906-4916.

Search Report for European Patent Application No. 19184349.9; dated Jul. 1, 2020.

Search Report for International Patent Application No. PCT/EP2020/068063; dated Sep. 24, 2020.

Cohere Technologies et al.; OTFS Modulation Waveform and Reference Signals for New RAT; 3GPP TSG RA NG1 Meeting #84-bis; Apr. 11-15, 2016; Busan, South Korea.

Office Action; Japanese Patent Application No. 2021-577311; dated Feb. 2, 2023.

* cited by examiner

ADAPTIVE TRANSMITTER SYMBOL ARRANGEMENT FOR OTFS CHANNEL ESTIMATION IN THE DELAY-DOPPLER DOMAIN

PRIORITY CLAIM

This patent application is a U.S. National Phase of International Patent Application No. PCT/EP2020/068063, filed 26 Jun. 2020, which claims priority to European Patent Application No. 19184349.9, filed 4 Jul. 2019, the disclosures of which are incorporated herein by reference in their entireties.

SUMMARY

Illustrative embodiments relate to the field of encoding and modulating information to be transmitted on wireless communication lines. Especially, disclosed embodiments relate to the processing and modulation in connection with the newly suggested orthogonal time frequency space (OTFS) modulation with embedded pilot-aided channel estimation in the delay-Doppler domain.

BRIEF DESCRIPTION OF THE DRAWINGS

Disclosed embodiments will be explained in great detail in connection with a drawings, in which.

DETAILED DESCRIPTION

OTFS modulation has shown to provide significant performance benefits over orthogonal frequency division multiplexing (OFDM) in situations where Doppler frequency shifts occur. This is the case when transmitter and receiver are moving relative to each other. Thus, wireless communication between transportation vehicles and between transportation vehicles and infrastructure and vice a versa are heavily influenced by Doppler frequency shifts.

The newly proposed OTFS modulation exhibits significant benefits over OFDM modulation currently used in the 4G standard long term evolution (LTE) mobile systems in multipath delay-Doppler channels where each path exhibits a different delay and Doppler shift. The delay-Doppler domain provides an alternative representation of a time-varying channel geometry due to moving objects (e.g., transmitters, receivers, or reflectors) in the scene. Leveraging on this presentation, OTFS multiplexes each information symbol over two-dimensional (2D) orthogonal basis functions, specifically designated to combat the dynamics of time-varying multipath channels. Then the information symbols placed in the delay-Doppler coordinate system or grid can be converted to the standard Time-frequency domain used by the traditional modulation schemes such as OFDM. This conversion is performed by a two-dimensional simplectic Fourier transform.

In a communication using the OTFS modulation symbols are arranged in a two-dimensional grid. In this delay-Doppler domain grid one dimension is associated with a delay of signals due to different transmission paths (delay domain) and the other dimension is associated with the Doppler frequency shift (Doppler domain) occurring during transmission. Thus, the delay domain dimension is a time-related dimension in the delay-Doppler domain and the Doppler domain dimension is a frequency-related dimension in the delay-Doppler domain. Symbols associated with the information to be transmitted are arranged in this delay-Doppler grid. Each grid is associated with a frame which is sequentially transmitted. The actual transmission takes place in a time-frequency domain we are used to in actual life. The delay-Doppler domain is transformed by a two-dimensional simplectic Fourier transform. In this transform the different grid positions of the Doppler domain are associated with different times in the time-frequency domain and the different grid positions of the delay dimension are associated with different frequencies or subcarriers used for transmission in the time-frequency domain. For the sake of clarity in this specification the time-related dimension in the delay-Doppler domain is always called delay dimension and the frequency-related dimension in the time-frequency domain Doppler dimension, respectively. The terms time dimension and frequency dimension are, thus, used only to describe the actual living environment, in which the frames are transmitted sequentially, each in a certain transmission time using different frequency carriers. Thus, the time dimension is the dimension in which we measure time and the frequency dimension is that dimension, in which we differentiate frequencies of transmission carriers.

In a multipath delay-Doppler scene it is necessary to know the channel impulse response (CIR) to be able to perform OTFS channel detection or equalization of the channels. Thus, the single pilot signal, which is associated with the pilot symbol, is placed in the grid and surrounded by guard symbols in the delay-Doppler domain grid. Guard symbols do not carry any energy. The number of guard symbols is chosen such that the area covered by the guard symbols parallel to the dimension associated with the time basis exceeds twice the maximum delay of transmitted signals occurring in the different paths. Thus, data symbols placed in the delay-Doppler domain grid possess a distance along the dimension associated with the time basis that is greater than the maximum delay occurring in any one of the communication paths.

The Doppler frequency shift (in short also called; Doppler shift) can be positive as well as negative depending on whether receiver and/or transmitter and/or reflector are closing in on each other or separate from each other. Therefore, the pilot symbol has to be guarded on each side parallel to the dimension associated with the frequency basis by twice the absolute value of the maximum Doppler frequency shift occurring in one of the paths.

The data symbols are placed outside the guard interval occupied by the guard symbols surrounding the pilot symbol. This arrangement enables the detection of the channel impulse response. Parts of the energy or intensity of the pilot symbol are "transferred" or "moved" to guard symbol locations in the delay-Doppler domain grid due to the Doppler frequency shifts occurring in the different paths as well as the different delays of the different paths. Thus, by evaluating the symbol intensities for the pilot symbol position and parts of the guard symbol positions in the received delay-Doppler domain grid the channel impulse response can be derived. This channel impulse response can then be used to equalize the intensities detected in the different delay-Doppler domain grid positions. This is based on the well-established assumption that all symbols in an delay-Doppler domain grid are affected in the same way by the different path, i.e., show the same channel impulse response. It is, thus, sufficient to determine the channel impulse response for one transmitted symbol, which is the pilot symbol. This is described in more detail by P. Raviteja, Khao T. Phan and Yi Hong in "Embedded Pilot-Aided Channel Estimation for OTFS in Delay-Doppler Channels", arXiv preprint arXiv:1808.08360 (2018), later published in revised form in IEEE Transaction on Vehicular Technology, vol 68, No. 5, May 2019, pp 4906-4917.

In "Embedded Delay-Doppler Channel Estimation for Orthogonal Time Frequency Space Modulation" by Raviteja et al., 2018 IEEE 88th Vehicular Technology Conference (VTC-Fall) pp 1-5, XP033535455, DOI: 10.1109/VTCFall.2018.8690836, the channel estimation is described.

Multiple access in orthogonal time frequency space communication systems is described in WO 2017/044660 A1.

The guard interval has to have a size such that none of the pilot symbol intensity will be transferred to data symbol grid space and at the same time that no data symbol intensity might be transferred to guard space positions to which the pilot symbol intensity could be transferred to during transmission. Thus, the dimensions of the guard interval, i.e., the number of guard symbols needed, is dependent on the maximum delay occurring in any one of the paths and the maximum Doppler frequency shift occurring in any one of the paths.

To be on the safe side, thus, the size of the guard interval, i.e., the number of guard symbols needed, is chosen to cover any possible occurring scenario and, thus, the worst case scenario leading to a large guard interval, i.e., a large number of guard symbols. This limits the bandwidth or number of data symbols that can be transmitted.

The disclosed embodiments improve wireless communication based on the orthogonal time frequency space modulation with channel estimation, especially to increase the data bandwidth in such a communication were moving transmitter and/or receivers and/or scatters occur. Thus, the problem to be solved is the increase in data bandwidth for wireless mobile communication with moving transmitters, receivers, and/or scatters.

The problem is solved by a method for adaptive transmitter symbol arrangement in delay-Doppler domain grids sequentially transmitted using an Orthogonal Time Frequency Space (OTFS) Modulation with channel estimation and a modulation module.

The exemplary embodiments disclose a method for adaptive transmitter symbol arrangement in delay-Doppler domain grids sequentially transmitted using an Orthogonal Time Frequency Space (OTFS) Modulation with channel estimation, wherein the delay-Doppler domain grids are two dimensional grids having a time-related delay dimension associated with a time basis and a frequency-related Doppler dimension associated with a frequency basis. The transmitter symbols may comprise at least one pilot symbol, guard symbols and data symbols. A disclosed the method includes retrieval of one or several current communication relevant parameters and deriving from the one or several current communication relevant parameters at least a maximum expected Doppler frequency shift for a transmitted signal.

A first guard space parameter may be equal to twice the absolute value of the maximum expected Doppler frequency shift. A maximum expected time delay for a transmitted signal may be a second guard space parameter.

The at least one pilot symbol may be placed in a delay-Doppler domain grid. A minimum number of guard symbols may be placed around the at least one pilot symbol in the delay-Doppler domain grid such that the guard symbols occupy a guard space around the at least one pilot symbol such that any grid position outside the guard space around the at least one pilot symbol has a distance along the first grid direction exceeding the derived first guard space parameter and also has a distance along the second grid direction that exceeds the second guard space parameter.

Data symbols may be placed in the delay-Doppler domain grid outside the guard space for data transmission. wherein the operations are iteratively carried out to adapt the minimum required number of guard symbols around the at least one pilot symbol. By retrieving one or several current communication relevant parameters it is possible to minimize the size of the guard interval surrounding the pilot symbol, such that this guard interval is optimally adjusted to the current communication situation.

In this way, the grid space in the delay-Doppler domain grid that is not used by the pilot symbol and the guard symbols is maximized, i.e., the bandwidth for data symbols is increased. By adapting the size of the guard interval, i.e., by adapting the number of guard symbols arranged around the pilot symbol, iteratively the data bandwidth is adapted always to the best achievable data bandwidth.

The disclosed embodiments also provide a modulation module of a transmitter is configured to adaptively arrange transmitter symbols in delay-Doppler domain grids sequentially transmitted using an Orthogonal Time Frequency Space (OTFS) Modulation with channel according to the method described herein.

The information from which the current communication relevant parameters may be retrieved may include status information about the transmitter, status information about one or more receivers, information about the type of communication, information about the message type of the communication, i.e., information about the content of the communication, information about the geometry of the communication, information about the environment which can comprise static information as well as dynamic information, for example, as telemetric data of transportation vehicles and/or persons in the vicinity, information about received signals in the communication, etc. This list is not exhaustive but mentions the most important information from which parameters that will influence the current communication can be retrieved.

It is to be understood that only one or a selection of the different parameters and information comprised in the above mentioned group need to be retrieved. To improve the method and to minimize the guard interval around the pilot symbol it will be beneficial in many cases to retrieve several parameters listed above.

The person skilled in the art will also appreciate that some of the terms given above are generic terms for more detailed parameters.

The transmitter status, for example, may comprise one or more of the following parameters: the transmitter position, the transmitter velocity, which in turn can be subdivided into the transmitter speed and the direction the transmitter is moving along.

Likewise a receiver status can comprise one or more of the following parameters: receiver position, receiver velocity (again comprises the receiver's speed and receiver's direction of motion).

In a disclosed embodiment retrieving the one or several current communication relevant parameters comprises receiving or determining the velocity or speed of the transmitter and receiving or determining the velocity or speed of a receiver and wherein the maximum expected Doppler frequency shift is derived based on the transmitter velocity or speed as well as the receiver velocity or speed. In this specification the velocity is considered to be a vector quantity comprising a speed and a direction of heading.

The maximum Doppler frequency shift $v_{max,exp}$ that can occur in one path is given by $$v_{max,exp} = 2s_{max}\cos\theta_{rel}\frac{f_0}{c}, \quad (1)$$

wherein $s_{max}$ is the absolute value of the relative speed of the transmitter and the receiver, $\theta_{rel}$ is the angle between the directions of motion of the transmitter and the receiver, $f_0$ is the frequency of the carrier signal used for transmission and c is the speed of light.

In this exemplary embodiment, the actual speeds or velocities of transmitter and receiver are taken into account to derive the correct maximum expected Doppler frequency shift.

According to at least one disclosed embodiment retrieving the one or several current communication relevant parameters comprises retrieving data from a database selected out of the group comprising speed limits, minimum expected Doppler frequency shifts, minimum expected delays, Map data, telemetric data of surrounding transportation vehicles, wherein the data in the database are correlated with a location.

The database can comprise one or several components. One of the components can be a local database component located at the transmitter. If the transmitter is located in a transportation vehicle this local database component comprises data stored in the transportation vehicle itself. The database can also comprise additionally external components or may be made up of external components only. The database might, for example, provide map data of the surrounding, speed limits for the surrounding roads, optionally for all traveling directions. It also might provide telemetric data collected from other transportation vehicles in the surrounding vicinity.

These data might be used, for example, to determine the different velocities the possible receivers are traveling. That receiver is chosen, which will yield the largest relative velocity or speed together with the velocity or speed of the transmitter. The data in the database are all associated with a location or position they are relevant for. Telemetric data of other transportation vehicles, for example, all comprise their respective current location. Thus, when data are inquired from the database the current location of the transmitter can be used to the select the telemetric data of all transportation vehicles in a certain distance around the transmitter. Other inquiry parameters may be provided to the database to optimize the result of an inquiry. For example, an indication of the highway or motorway the transportation vehicle carrying the transmitter is traveling on, will help to select telemetric data from those transportation vehicles only traveling on the same highway or motorway.

In some exemplary embodiments the retrieving of data from the database comprises retrieving a minimum expected Doppler frequency shift and/or a minimum expected delay and wherein the maximum expected Doppler frequency shift is determined to at least equal the retrieved minimum expected Doppler frequency shift and/or the maximum expected delay is determined to at least equal the retrieved minimum expected delay. This ensures in situations where other communication relevant parameters indicate that a very small guard interval will be satisfactory and would result in the a determined maximum expected delay smaller than the minimum expected delay retrieved and/or result in a maximum expected Doppler frequency shift that is smaller than the retrieved minimum expected Doppler shift that the maximum expected Doppler frequency shift is increased at least two equal the minimum expected Doppler frequency shift and/or to increase the maximum expected delay to equal at least the minimum expected delay. This can occur in cases where a line-of-sight communication with the transportation vehicle traveling in the same direction at almost the same speed is carried out, where known moving reflectors are situated next to the position the transmitting transportation vehicle is currently located. These moving reflectors might cause a Doppler frequency shift that well exceeds the Doppler frequency shift induced by the moving transmitter and the moving receiver. The same applies to the possible delay which might be caused by known reflectors distant to the current position of the transmitter which nevertheless provide considerable reflection arrow for the receiver.

The communication type determines the receiver or kind of receiver to be considered when determining the guard interval. Therefore, in some exemplary embodiment retrieving the one or several current communication relevant parameters comprises retrieving a communication type and wherein the scheme for determining the maximum expected Doppler frequency shift is determined based on the retrieved communication type. The most relevant communication types are vehicle-to-vehicle (V2V), vehicle-to-infrastructure (V2I), and infrastructure-to-vehicle (I2V), which are influenced by a moving transmitter and/or receiver. There may be also infrastructure to infrastructure (I2I) communication in the field of traffic related communication which is highly influenced by moving transportation vehicles in the vicinity. In these circumstances the proposed method for arrangement of transmitter symbols can also be used. The communication type mainly determines whether the receiver and the transmitter are both moving, whether the receiver or the transmitter are moving only, or, in the case of infrastructure to infrastructure communication, neither the receiver nor transmitter are moving. Especially for those situations, where one of the transmitter and receiver is moving only, the scheme for deriving the maximum expected Doppler frequency shift is different from situations where both the transmitter and receiver are moving. For V2I communication, for example, where only the transmitter is moving only the velocity of the transmitter relative to the infrastructure needs to be taken into account. This is similar to the situation where the transmitter is stationary and the receiver is moving only. In the letter case though the speed of the receiver is not known precisely in most cases.

Further the geometry of the transmitter and receiver relative to each other is especially influencing the delay that is to be expected. One differentiates between communication that is carried out in line-of-sight (LOS) and communication that is carried out with non-line-of-sight (NLOS). These two scenarios are considered to be two different communication geometries or transmission geometries. For a line-of-sight communication where there is a direct line-of-sight between the transmitter and the receiver one expects small delays and one dominating radio path. On the other hand one expects larger delays in scenarios where there is no direct line-of-sight between the transmitter and receiver. A typical delay for a LOS communication between traveling cars will be in the order of about 10 to 15 nano seconds (ns). The delays occurring typically show a standard deviation of delay spread of 13 ns, for example. NLOS communication will be roughly one order of magnitude larger. The standard deviation of delay spread will be at least 87 ns, for example, but might increase in other scenarios well to about 150 ns. In all cases the LOS and NLOS spread in delay times increases with the distance between transmitter and receiver. Thus, according to the geometry parameter for Los and NLOS minimum delay values can be provided. If other communication relevant parameters indicate larger delays the maximum expected delay is obviously chosen to take on the larger value.

Therefore in some exemplary embodiments retrieving the one or several current communication relevant parameters comprises determining or receiving a transmission geometry information indicating whether the transmission will be a line-of-sight or a non-line-of-sight transmission and wherein the maximum expected delay is increased for a non-line-of-sight transmission.

According to at least one disclosed embodiment the transmission geometry is derived from map information in combination with the position of the transmitter and/or the position of the receiver.

In scenarios where the possible receiver of the communication has to be selected out of a group of receivers always that receiver is selected that in determining the maximum expected Doppler frequency shift and/or the maximum expected delay will yield the largest possible values for all the possible receivers. In this respect it is necessary to appreciate that the receiver selected out of the group of receivers to determine the maximum expected Doppler frequency shift can be a different receiver from the one used to determine the maximum expected delay.

One other parameter influencing the maximum expected Doppler frequency shift and the maximum expected delay is the type of content that is transmitted by the data symbols. This parameter can also be called message type indicating what type of message is transmitted. The transmitted messages, i.e., the massage types, may comprise maneuver cooperation messages (MCM), signal phase and timing messages (SPaT) sent, for example, from traffic lights, decentralized environmental notification messages (DENM), or map messages (MAP) to exchange map related data, etc. just to name a few.

According to at least one disclosed embodiment retrieving the one or several current communication relevant parameters comprises deriving or receiving a message type for the message to be communicated by transmitting the delay-Doppler domain grids, wherein the scheme to determine the maximum relative speed or velocity to determine the maximum expected Doppler frequency shift is chosen dependent on the message type. This can be a direct dependence or an indirect dependence. In the latter case the message type is used to infer or deduce other communication relevant parameters influencing the maximum expected Doppler frequency shift and or maximum expected delay.

These message types can be used to derive other communication relevant parameters like the communication type in some cases. Whereas an MCM message indicates the V2V communication an SPaT message indicates an I2V communication type. A map message to retrieve map data from an external database component indicates the V2I communication type.

Combinations of the different parameters may further increase the accuracy of the derived maximum expected Doppler frequency shift and the maximum expected delay. These parameters may also be used to detail the query sent to a database to retrieve communication relevant parameters from the database.

The message type parameter or some of the values it can take can be associated with certain a minimum Doppler frequency shift and/or minimum delay value and/or minimum Doppler frequency shift margin and/or a minimum delay margin. Different messages can be associated with different minimum Doppler frequency shifts and/or minimum delay values and/or minimum Doppler frequency shift margins and/or a minimum delay margins. Emergency messages can, for example, be associated with a minimum Doppler frequency shift and/or minimum delay which if used as maximum expected Doppler frequency shift and/or maximum expected delay will ensure that there is no interference between data symbols and the pilot in the received delay-Doppler domain grids. Alternatively the minimum Doppler frequency shift margin and/or a minimum delay margin associated with a certain message can be added to the maximum expected Doppler frequency shift and/or maximum expected delay derived so far, respectively, to ensure this non-interference between pilot and data symbols.

It is proven to be beneficial to also take the received messages from communication into account for determining communication relevant parameters. Thus, in some exemplary embodiments retrieving one or several current communication relevant parameters comprises deriving a reception delay and/or a reception Doppler frequency shift from one or more received messages and wherein the maximum expected Doppler frequency shift is determined to at least equal the reception Doppler frequency shift and/or the maximum expected delay is determined to at least equal the reception delay. The reception delay may be chosen to be the largest delay found in received communication messages received from transmitters that are associated with receivers of the upcoming transmission for which the symbol arrangement is carried out. The same applies to the reception Doppler frequency shift which is determined to be the largest Doppler frequency shift found in any of the received messages that were received optionally from transmitters associated to possible receivers of the upcoming transmission for which the respective symbols are arranged.

To ensure that the information to be transmitted is coded into a number of symbols that corresponds to the number of grid spaces for data symbols in the current frame in a disclosed embodiment information about the grid positions actually used for arranging the guard symbol and/or about the grid positions actually used for arranging data symbols are provided to a communication control module modulating information into data symbols.

To ease demodulation and decoding at a receiver in some exemplary embodiments the information about the grid positions actually used for arranging the guard symbols and/or about the grid positions actually used for arranging data symbols are coded into one or more of the data symbols arranged in operation at e) in the in the current delay-Doppler domain grid. This makes decoding and/or demodulation faster and more reliable.

Optionally, this information on the use of grid positions is coded in to symbols arranged in grid positions always used for the arrangement of data symbols. Thus, this information is always present in the receiver. Although coding this information into the data symbols reduces the bandwidth for other information the overall gain due to an increase in transferable data symbols in most/or many grids will outweigh this small "loss" in bandwidth.

Figure 1:
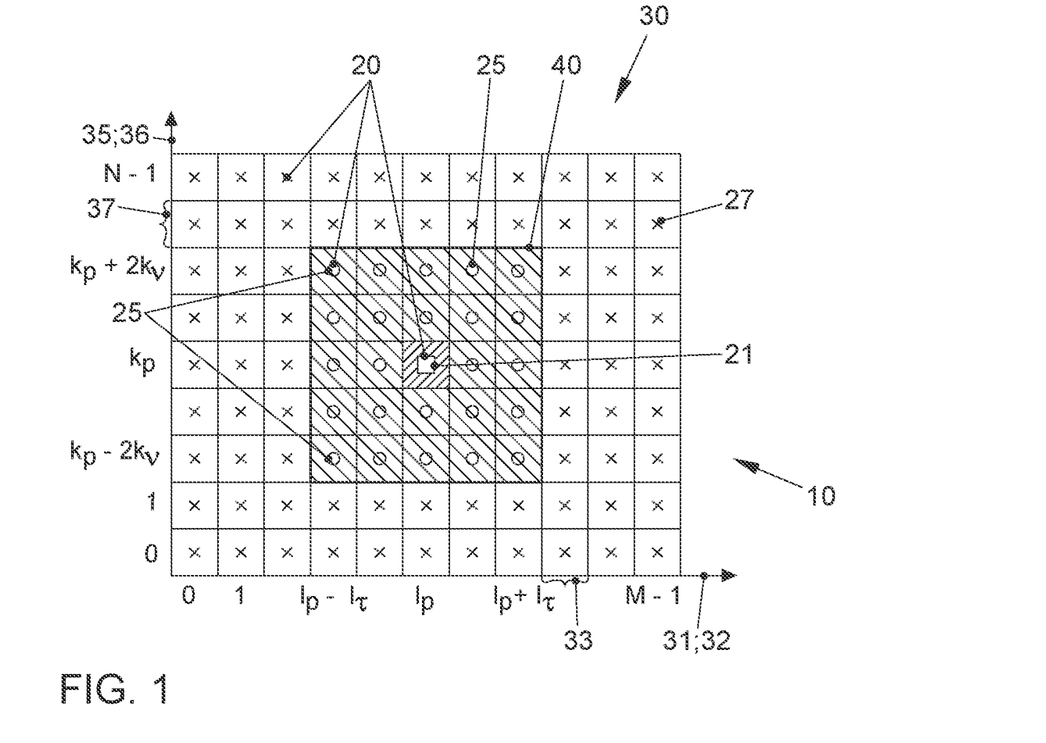
FIG. 1 is a schematic example embodiment of a transmission frame as a delay-Doppler domain grid.

FIG. 1 shows a graphic representation of the frame 10 comprising transmitter symbols 20. The frame 10 depicts a two dimensional grid 30 in the delayed-Doppler domain. One dimension, the abscissa, is associated with a time basis 31. This dimension is also associated with the delay occurring during transmission. The other dimension, the ordinate, is associated with a frequency basis 35. This dimension is also associated with the Doppler frequency shift occurring during transmission.

Along the Delay dimension the delay-Doppler grid 30 is divided into M discrete delay intervals 33. Accordingly along the Doppler dimension the delay-Doppler grid 30 is divided into in Doppler frequency shift intervals 30.

The transmitter symbols 20 arranged in the delay-Doppler domain grid 30 comprise a pilot symbol 21, depicted by the square. During transmission the energy of the pilot symbol 21 is usually partly transferred to other grid positions in the received delay-Doppler grid. Usually the transmitted signal reaches the receiver via multiple different paths. This leads to different delays for the transmitted pilot symbol in addition Doppler frequency shifts occurring due to the relative motion of the receiver and/or the transmitter and/or reflectors in the different paths. The channel analysis of this energy transfer to the different grid positions yields the so-called channel impulse response (CIR). It is a very good assumption that all symbols in a delay-Doppler grid are similarly affected by the transmission. Thus, the channel impulse response should be equal for all symbols transmitted regardless of the grid position the symbol is arranged in. Thus, the channel impulse response needs to be evaluated for one symbol, the pilot symbol, only, to enable equalization of the received intensities for all symbols or grid positions.

To enable a correct analysis of the channel impulse response one has to ensure that no energy transfer from other symbols takes place to those grid positions to which energy, i.e., intensity, of the pilot symbol is transferred. Also the intensity of the pilot symbol must not be transferred to grid positions having any start "original" intensity. This is insured by placing guard symbols 25, depicted by circles, around the pilot symbol 21 to form a two-dimensional guard interval 40. The guard interval 40 has the rectangular shape.

The remaining grid spaces of the grid 30 outside the two-dimensional guard interval 40 may be used to place data symbols 27 depicted by crosses. The larger the number of data symbols 27 is that can be placed in the delay Doppler domain grid 30 the larger the bandwidth reserved for transmission of information is.

For the further discussion it is assumed that the pilot symbol 21 is located at the grid position (lp,kp). lP denotes the grid position long the delay dimension 32 whereas kp denotes the grid position along the Doppler dimension.

$l\tau$ corresponds to the number of grid positions needed to ensure that due to delay effects neither energy of the pilot symbol 21 is transferred to any grid position outside the guard interval 40 nor is any energy of the data symbols transferred to guard symbol positions to which the intensity of the pilot symbol could be transferred. The two-dimensional guard interval 40 extends along the delay axis from lp−l$\tau$ to lp+l$\tau$, i.e., one 2nd guard space parameter in either direction.

kv represents the number of Doppler intervals 37 that correspond to the maximum expected Doppler frequency shift. The Doppler frequency shift can transfer intensity of the pilot symbol 21 towards higher frequency as well as towards lower frequencies. Also intensity of data symbols 27 can be transferred to higher and lower frequencies. the guard interval along the Doppler axes extends from kp−2kv to kp+2kv, i.e., one first guard space parameter in either direction.

Thus, rather than having a fixed two-dimensional guard interval 40 determined for the worst case scenario, i.e., taking into consideration the maximum relative speed between transmitter, and receiver, and reflectors and the maximum delays that can occur in different transmission paths not always known in advance, the disclosed embodiments aim at optimizing the maximum expected Doppler frequency shift and/or the maximum expected delay, optionally both, according to the actual parameters that are relevant for the transmission of a particular frame, i.e., delay-Doppler domain grid 30. Thus, the number of guard symbols 25 is adapted to the actual need for robust communication. In other words the numbers l$\tau$ and kv are adjusted to minimize the two-dimensional guard interval 40 and on the other hand to maximize the number of grid positions available for data symbols 27.

A delay-Doppler domain grid 30 depicts one frame for the orthogonal time frequency and space (OTFS) modulation scheme. The person skilled in the art will appreciate that the delay-Doppler domain grids 30 as depicted in FIG. 1 will be subjected to two-dimensional simplectic Fourier transformation first. The result of this transformation will be used to actually create the time signal with a Gabor filterbank or also called a Weyl-Heisenberg signaling filterbank transmitted from the transmitter to the receiver. For this later operation, the traditional modulation schemes such as OFDM modulation may also be used. On reception this process is carried out in reverse.

Figure 2:
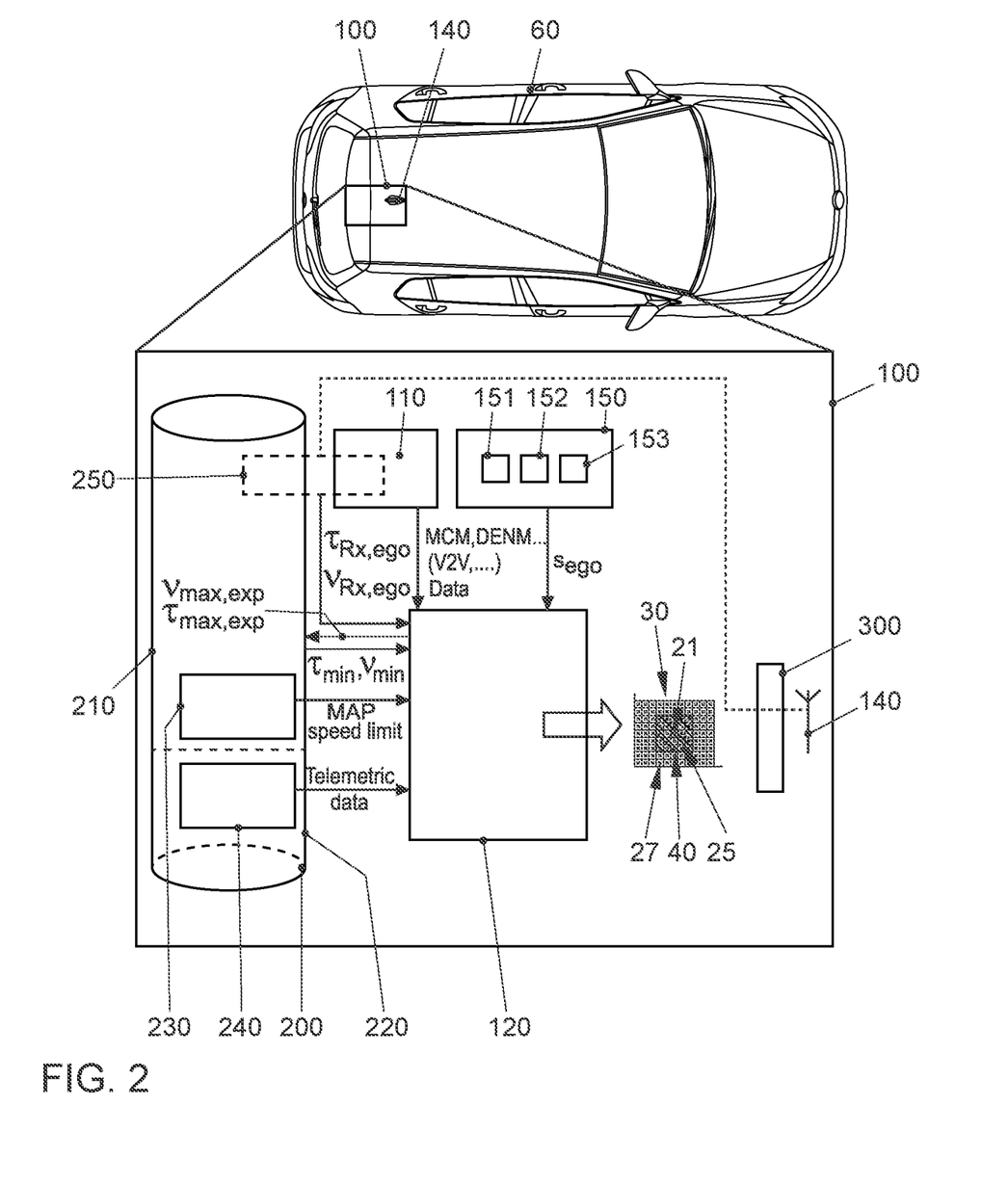
FIG. 2 is a schematic drawing of a modulation module in a transportation vehicle.

FIG. 2 displays this schematic drawing of the transportation vehicle 60 comprising a communication system 100 with a modulation module 120 configured to adaptively arrange transmitter symbols in delay-Doppler domain grids 30 sequentially transmitted using an OTFS Modulation with channel estimation via a transmitter 140.

The modulation module 120 is responsible for arranging transmitter symbols 20 in delay-Doppler domain grids 30 to be transmitted sequentially. The modulation module 120 retrieves different parameters 50 that are communication relevant. These can be retrieved from different sources. The communication relevant parameters retrieved can be used on their own or in combination with other parameters to derive the maximum expected delay-Doppler frequency shift vmax,exp and the maximum expected delay $\tau$max,exp.

The maximum expected Doppler frequency shift vmax, exp depends on the speed and heading, i.e., the velocity, as communication relevant parameters of the transmitter Tx as well as the speed and heading, i.e., the velocity of the external receiver Rx of a different transportation vehicle or infrastructure. If there are more than one possible recipients and, thus, receivers of the communication the velocity of that external receiver is chosen, which will lead to the maximum relative velocity with the velocity of the transmitter Tx of transportation vehicle 60.

A status module 150 of the transportation vehicle 60 provides the communication relevant parameters characterizing the status of the transmitter Tx. These communication relevant parameters comprise the speed sego of the transportation vehicle 60, the direction dego or heading of the transportation vehicle 60, which might be combined into the velocity vego of the transportation vehicle 60, and the current position rego of the transportation vehicle 60. All these parameters associated with the transportation vehicle 60 can also be associated with the transmitter Tx as this is fixed to the transportation vehicle 60.

The status module 150 may include several vehicle systems for providing the above mentioned status parameters. Among others these can be navigation systems and sensors. The position may be provided with respect to coordinate system, optionally a global coordinate system. Thus, the position may be provided by satellite navigation system 151. Additional or supplemental position information may be provided by an inertia based navigation system 152. These navigation systems 151, 152 may also provide the direction of movement dego, i.e., the heading of the transportation vehicle, and the speed sego of the transportation vehicle 60. Both can be combined to the velocity vego. The speed sego can also be provided by other sensors 153 in the transportation vehicle.

The status information about a receiver can be estimated or derived from different communication relevant parameters. In a simple case the speed limit for the road the transportation vehicle 60 is traveling on is retrieved from a database 200. The database 200 may comprise a local database component 210 stored in the transportation vehicle 60. The database 200 can also comprise one or more external database components 220 located outside the transportation vehicle 60.

This local database 210 may, for example, comprise map data 230. The map data 230 could be supplied by one of the external database components 220 as well. The map data 230 itself may comprise geometric data which represent roads, terrain shape, buildings etc. as well as information about traffic signs and speed limits. The information in the database 200 is always related to the respective location. Thus, by providing the actual position of the transportation vehicle 60 the relevant data in the vicinity can be retrieved from the database 200.

The speed limit information can be used, for example, to estimate the maximum speed of other transportation vehicles in the vicinity. Together with information about the roads it is also possible to derive possible velocities of the other transportation vehicles in the vicinity. From these information the maximum estimated relative speed smax and the associated angle θrel between the directions of motion can be derived.

A more sophisticated result is achieved if also the type of message to be transmitted is taken into account. If the transportation vehicle 60, for example, transmits a maneuver cooperation message (MCM) to another transportation vehicle traveling in the same direction the relative speed between the ego speed sego of transportation vehicle 60 in the speed of the slowest car or between the ego speed sego and the speed limit for traveling in the direction of the transportation vehicle 60 have to be taken into account to derive the correct expected relative speed. In a first approximation the speed limit is the largest possible relative speed smax. More precisely the maximum relative speed is the absolute value of the speed of the transportation vehicle and the minimum expected speed of the other transportation vehicle or the absolute value of the difference of the speed of the transportation vehicle 60 and the speed limit for traveling in the same direction as the transportation vehicle 60.

The resulting maximum relative speed smax is lower than for a scenarios where the other transportation vehicle is moving in the opposite direction to the transportation vehicle 60. Thus, on the other hand if the transportation vehicle 60 wants to transmit a decentralized environmental notification message (DENM) it has to take into account its own (ego) speed and the speed limit for traveling in the opposite direction to determine the correct maximum relative speed smax by adding its own speed to the speed limit of the opposite direction.

Thus, by using the message type parameter which might be provided by communication control module 110 the scheme for determining the maximum expected relative speed or velocity and in turn of the maximum expected Doppler frequency shift vmax,exp can be further improved.

In other disclosed embodiments additionally and/or alternatively telemetric data of other transportation vehicles in the vicinity of the transportation vehicle 60 retrieved from the database, especially from the external database component 220, may be used to determine the maximum estimated relative speed smax between the transmitter Tx and the receiver Rx of the other transportation vehicle or transportation vehicles.

In case the telemetric data indicate that none of the other transportation vehicles traveling in the opposite direction is traveling close to the speed limit the speed of the fastest transportation vehicle traveling in the opposite direction in combination with the speed sego of the transportation vehicle 60 can be used to determine the maximum estimated relative speed smax or velocity vmax and in turn of the maximum estimated Doppler frequency shift vmax,exp.

Especially for deriving the maximum estimated delay geometric data are of particular interest. The geometric data indicate directly or help to derive whether the transmission will be a LOS communication or a NLOS communication.

In other instances this geometric data can be derived from telemetric data 240 and/or map data 230 received from the database 200. The telemetric data 240 may be part of the external database component 220. Line-of-sight communication will suffer only short delays whereas non-line-of-sight communications are heavily influenced by different delays occurring in different transmission paths.

The number and type of other transportation vehicles surrounding the transportation vehicle 60 also influence the maximum expected delay. Trucks or lorries traveling the same direction as transportation vehicle 60 will, for example, increase the maximum expected delay in communication to other transportation vehicles traveling in the direction of transportation vehicle 60. This is due to the fact that these provide large surfaces for the reflection of signal that are more or less perpendicular to the direction the signal needs to be transmitted along.

The modulation module 120 may also take into account information about a maximum reception delay τRx,ego and/or a maximum reception Doppler frequency shift. The maximum reception delay in the maximum reception Doppler frequency shift vRx,ego are both determined from received transmissions 250. The maximum Doppler frequency shift and/or the maximum delay determined in the analysis of the channel impulse response for the pilot symbol of received delay Doppler domain grids, provide good estimates for these parameters for those scenarios where the received delay-Doppler domain grids were sent from a transmitter or transmitters associated with the receiver or receivers, respectively, for which the transmitter symbols are arranged in the delay-Doppler grid 30 to be transmitted by the transmitter Tx of the transportation vehicle 60.

The determined maximum estimated delay should be greater or equal to the maximum reception delay τRx,ego derived from received delay-Doppler grids. The same applies to the determined maximum estimated Doppler frequency shift. This should also be greater or equal to the maximum reception Doppler frequency shift vRx,ego derived from received delay-Doppler grids.

It is also possible that the database 200 provides minimum delay τmin values and/or minimum Doppler frequency shift vmin values for certain or all locations. In this case the modulation module 120 verifies the derived maximum estimated delay against the provided or received minimum delay τmin and ensures that the derived maximum estimated delay is greater or equal to the minimum delay. I.e., the so far derived maximum estimated delay is compared to the minimum delay. In case the derived maximum expected delay is smaller than the minimum delay τmin the derived maximum expected delay is increased to be equal to the minimum delay τmin. In case a minimum Doppler frequency shift vmin is provided or received the modulation module 120 compares the maximum estimated Doppler frequency shift derived so far with the minimum Doppler frequency shift vmin and increases the derived maximum expected Doppler frequency shift to the minimum Doppler frequency shift in case the determined maximum expected Doppler frequency shift does not exceed or is not equal to the minimum Doppler frequency shift vmin already.

When the modulation module 120 has finished determining the maximum expected Doppler frequency shift vmax, exp and the maximum expected delay τmax,exp the pilot symbol 21 as well as guard symbols 25 are placed in the delay-Doppler domain grid 30 such that all grid positions available for data symbols 27 have a distance from the position of the pilot symbol measured parallel to the time dimension greater than the maximum expected delay τmax, exp and measured parallel to the frequency dimension greater than two times the maximum expected Doppler frequency shift vmax,exp. I.e., the number of Doppler intervals needed in each direction along the Doppler dimension as well as the number of time intervals along the time dimension is chosen to ensure the correct size of the two-dimensional guard interval. The modulation module 120 chooses the lowest number of guard symbols needed to achieve guard interval 40 that enables the channel impulse response analysis of the pilot symbol at the receiver. The pilot symbol 21 is a pilot tone.

The delay-Doppler domain grids 30 are further processed by a modulation and signal generation unit 300 prior to being transmitted via transmitter 140.

The maximum expected Doppler frequency shift and the maximum expected delay used for determining the arrangement of the guard symbols are stored together with the current location and optionally the message type and/or communication type.

The maximum expected Doppler frequency shift and the maximum expected delay may also be or alternatively provided to the communication control module to provide adequate data symbols, i.e., to map the information to be transmitted to the correct number of data symbols available for the respective frame/grid. The actual number of guard symbols and in some exemplary embodiments additionally the locations of the guard symbols used is coded into one or more data symbols. Especially such data symbols are used for this purpose, which are arranged in delay-Doppler grid positions always used for data symbols transmission even in very bad delay-Doppler scenarios with large delays and high Doppler frequency shifts occurring.

This process described is iteratively carried out. Optionally, it is carried out for each delay-Doppler grid 30 transmitted from the transmitter Tx of the transportation vehicle 60 to the receiver Rx of the other transportation vehicle or infrastructure component. Thus, always the maximum possible data symbols can be transmitted with each delay-Doppler grid 30.

In connection with FIG. 3 and FIG. 4 an exemplary embodiment for the method to adaptively arrange transmitter symbols in delay-Doppler domain grids sequentially transmitted using an OTFS Modulation with channel estimation will be described.

Figure 3:
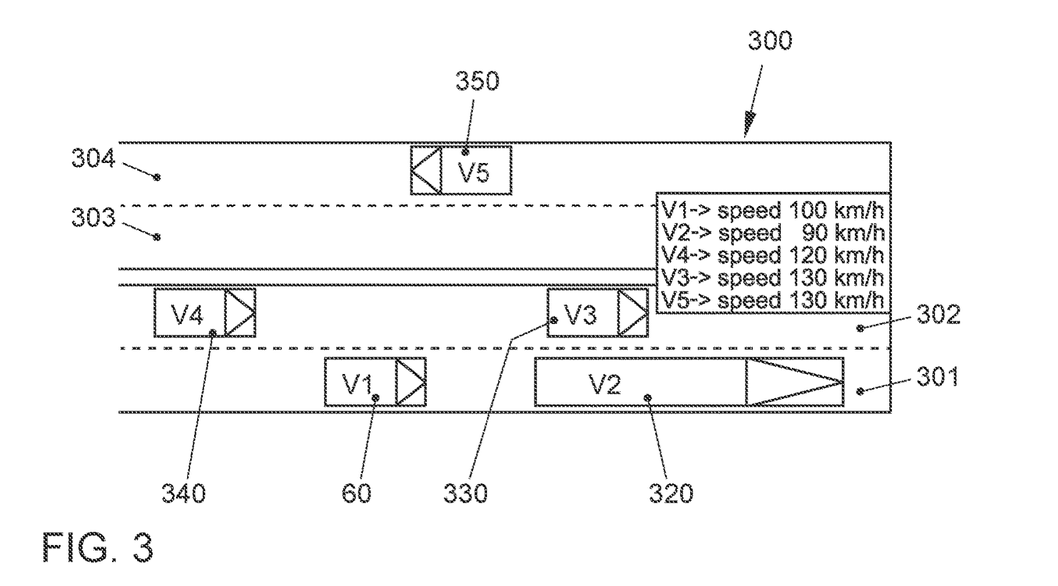
FIG. 3 is a schematic scenario for the explanation of vehicle-to-vehicle communication examples.

FIG. 3 depicts schematically a highway 300. Lanes 301 and 302 are for transportation vehicles traveling from left to right, whereas lanes 303 and 304 are reserved for transportation vehicles traveling from right to left.

Transportation vehicle 60, a passenger car, travels at a speed of 100 km/h behind a truck 320 traveling at the speed of 90 km/h. Both are traveling in right lane 301 for traffic traveling from left to right. Two further passenger cars are traveling in the left lane 302. One of the passenger cars, transportation vehicle 330, is overtaking the truck 320 at a speed of 130 km/h. The other passenger car, transportation vehicle 340, travels at a speed of 120 km/h behind transportation vehicle 60.

One further transportation vehicle 350 is traveling in the opposite direction to transportation vehicle 60 in the right lane 304 for transportation vehicles traveling from right to left.

FIG. 3, thus, depicts the following scenario: Transportation vehicle 60 closes in on the truck 320 and wants to pass it. Assuming the transportation vehicles 60, 320-350 operate autonomously, they exchange messages to coordinate their driving behavior. In this situation, for example, transportation vehicle 60 would send out the maneuver cooperation message (MCM) to the other transportation vehicle 340 following behind in the left lane 302.

Figure 4:
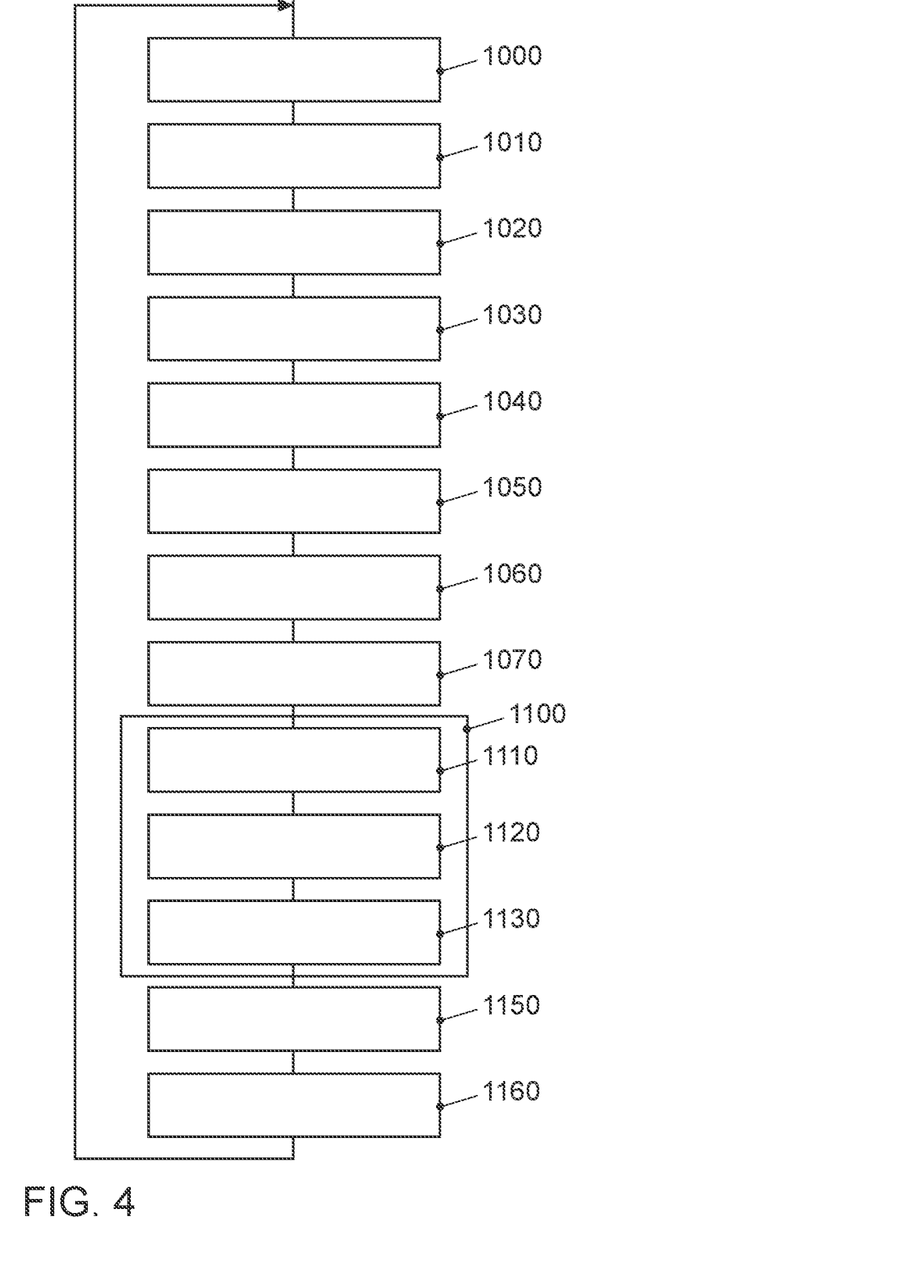
FIG. 4 is a flowchart for the exemplary method of arranging transmitter symbols in a delay Doppler domain grid to be transmitted.

FIG. 4 shows schematically a flowchart illustrating an exemplary embodiment of the method carried out in the modulation module that is responsible for arranging the transmitter symbols in the delay-Doppler domain grids which are sequentially transmitted when sending the maneuver cooperation message (MCM).

Even though the operations are displayed and described in a certain order the person skilled in the art will appreciate that some of the operations described could be interchanged in their order or partly even permuted.

According to operation at 1000 status data about the own transportation vehicle, i.e., transportation vehicle 60, are retrieved from car systems, for example, the navigation system, of transportation vehicle 60. Parameters associated with transportation vehicle 60 are called ego parameters. These status data, which are the status data for the transmitter Tx comprise the ego speed sego of transportation vehicle 60 which is 100 km/h.

According to operation at 1010 the speed limit is retrieved from the database, which in this case comprises map data of a traffic map. The derived speed limit is 130 km/h. Thus, the maximum speed for the other transportation vehicle 340 is estimated to be 130 km/h. In this retrieve operation the current position of transportation vehicle 60 is either implicitly added to the query of the database or extracted from the status data previously retrieved and added to the database inquiry.

A communication control module initiating the communication provides the message type, maneuver cooperation message (MCM). Thus, according to operation at 1020 the message type is retrieved as a communication relevant parameter. The modulation module can infer from this information that the communication type will be of V2V communication. In other situations the communication type might be provided and/or retrieved additionally in a separate method operation.

In operation at 1030 the scheme for determining the maximum relative speed smax needed for determining the maximum expected Doppler frequency shift vmax,exp is selected based on the communication relevant parameters retrieved. In this case it can be inferred from the message type MCM and the communication type V2V that the speed difference is limited by the speed limit. It is also possible to add a safety margin. This speed difference though occurs only in situations where the ego speed would be zero or equal to the speed limit. As the ego speed sego is 100 km, which is more than a half of the speed limit, which is 130 km, the maximum relative speed smax would be between the ego speed sego and another transportation vehicle at rest. Thus, in this case the relative speed smax needed for the calculation of the Doppler shift is set to the ego speed sego. At the same time the angle θrel between the directions of motion (relative angel of motion) can be estimated to be 0° as possible recipients are traveling in the same direction. The small angle actually existing due to the fact that transportation vehicle 60 and the other transportation vehicle 340 and not traveling in the same lane can be neglected.

In operation at 1040 the maximum expected Doppler frequency shift is derived by using the equation (1) given above taking into account the maximum relative speed smax and the relative angle of motion θrel determined before.

In operation at 1050 the communication relevant parameters are used to determine the maximum expected delay τmax,exp. From the message type MCM and the communication type V2V it can also be inferred that the communication geometry will most likely be a LOS communication. Thus, a certain amount of delay can be estimated for the maximum expected delay τmax,exp. The estimation can be carried out, for example, by using a lookup table dependent on one or several communication relevant parameters out of the group comprising message type, communication type, geometry type, ego speed, a traffic index etc.

A traffic index in at least one disclosed embodiment, for example, indicates the number and type of transportation vehicles in the vicinity of transportation vehicle 60. The traffic index may, for example, increase with the number of transportation vehicles and also increase with the number of tracks or lorries. The reasoning behind this type of traffic index is the fact that the number of reflectors inducing delays as well as the number of transmission paths increase with the number of transportation vehicle and especially when these transportation vehicles are trucks or lorries.

There might be different lookup tables listing expected delays for different combinations of communication relevant parameters.

In other disclosed embodiments telemetric data retrieved from the database, for example, an external database component, may also be used to determine such traffic index or to calculate directly probable delays based on estimated transmission paths. Map data may also be used additionally in this calculation.

In operation at 1060 it is checked whether communication messages, i.e., delay-Doppler grids, have been received from which and maximum reception Doppler frequency shift and/or maximum reception delay can be derived. If any of these communication relevant parameters, i.e., the maximum reception Doppler frequency shift and/or maximum reception delay are present they are used to improve the value for the maximum expected Doppler frequency shift and/or the maximum expected delay.

For this purpose the maximum expected Doppler frequency shift derived so far is compared to the maximum reception Doppler frequency shift. If the maximum expected Doppler frequency shift derived so far is lower than the maximum reception Doppler frequency shift the maximum expected Doppler frequency shift is increased to equal at least the maximum reception Doppler frequency shift.

Analogously the maximum expected delay derived so far is compared to the maximum reception delay. In case the maximum expected delay derived so far is lower than the maximum reception delay the maximum expected delay derived so far is increased to equal at least the maximum reception delay.

In operation at 1070 the database is checked for the existence of a minimum Doppler frequency shift and/or a minimum delay.

In case the minimum Doppler frequency shift and/or a minimum delay exist again these values are used to verify the maximum expected Doppler frequency shift and the maximum expected delay both derived so far.

Again the maximum expected Doppler frequency shift is compared to the minimum Doppler frequency shift. In case the maximum expected Doppler frequency shift is lower than the minimum Doppler frequency shift the maximum expected Doppler frequency shift is increased to equal at least the minimum Doppler frequency shift.

Likewise the maximum expected delay is compared to the minimum delay, if present. In case the maximum expected delay derived so far is less than the minimum delay retrieved from the database the maximum expected delay is increased to equal at least the minimum delay.

Now optimal values for the maximum expected Doppler frequency shift and the maximum expected delay have been derived. These are now used to arrange the transmission symbols in a delay-Doppler domain grid according to operations at 1110 to 1130.

First a pilot symbol is placed at a chosen location according to operation at 1110. This location can be chosen according to the principles known in the prior art.

Next guard symbols are arranged around the pilot symbol according to operation at 1120. The guard symbols are arranged to form a rectangular two-dimensional guard interval around the pilot symbol, which is centered in the two-dimensional guard interval. The number of guard symbols is chosen to be the smallest possible number with the constraint that any of the non-occupied grid positions, which will be used for arrangement of data symbols, has a distance that is greater than the maximum expected delay along the (time dimension) delay dimension of the delay-Doppler domain grid. Further those grid positions have a distance greater than twice the maximum expected Doppler frequency shift from the pilot symbol measured along the (frequency dimension) Doppler frequency shift dimension.

According to operation at 1150 the values of the maximum expected Doppler frequency shift and the maximum expected delay used for arranging the transmission symbols are saved together with the current location of the transportation vehicle 60 to the database and/or are provided to the communication control module. Optionally, also the message type and/or the communication type, if known, are saved in the database associated with the maximum expected Doppler frequency shift and the maximum expected delay According to operation at 1160, the operations given above are repeated to ensure that the arrangement of transmission symbols in the delay-Doppler domain grid are always optimized to achieve a safe and robust communication as well as a maximized bandwidth for data transmission.

In the following paragraphs it will be explained how other combinations of communication relevant parameters that are retrieved will influence and modify certain actions described above in relation to the communication scenario of a maneuver cooperation message MCM.

The second example concerns the communication of the decentralized environmental notification message (DENM). This is again of V2V communication. Such a message is sent, for example, if an accident occurred. Again it is referred to the traffic situation depicted in FIG. 3.

Transportation vehicle 60 traveling at an ego speed sego of 100 km/h wants to transmit the DENM. This time transportation vehicles traveling the opposite direction have to be taken into account. Thus, the maximum relative speed smax 1 in this case results from the speed limit for transportation vehicles traveling the opposite direction of transportation vehicle 60 and the ego speed of the transportation vehicle 60. The speed limit for the cars traveling from right to left is assumed to be 130 km/h. Thus, the maximum relative speed smax will be 100 km/h+130 km/h totaling to 230 km/h. To take into account transportation vehicles traveling above the speed limit a margin of 20 km/h may be added on top. Thus, the maximum relative speed smax used for deriving the maximum expected Doppler frequency shift will be smax=250 km/h.

In a situation where all telemetric data from the cars in the vicinity are known the maximum relative speed can be derived more accurately from the telemetric speed information. In this case a safety margin can be omitted or reduced.

In a further example a transportation vehicle wants to communicate with infrastructure which is not in motion. In this case the communication type is V2I. The maximum expected Doppler frequency shift can be derived from the ego speed sego of the transportation vehicle initiating the communication.

The respective maximum expected delay in this case is mainly dependent on the geometry type whether it will be a LOS or NLOS communication. This can be inferred from map data as communication relevant parameters in most cases.

In another example an infrastructure component wants to initiate communication with the transportation vehicle, for example, to send out the signal phase and timing (SPaT) message informing of signal phases and the timing of a traffic light. In this case the maximum expected Doppler frequency shift can be derived based on a maximum relative speed smax that is estimated to be the speed limit. The expected maximum delay in this case can be derived from database information. Usually a delay value will be provided directly. In other cases the delay may dependent from the time. This might take into account changes in the usual amount of traffic at different times. Thus, in this case there might exist a lookup table where for different days and times different maximum expected delay values are listed. These values may also be regarded as the minimum delay values provided by a database in case the infrastructure is taking into account other parameters to make other estimations for the maximum expected delay.

It will be appreciated by the person skilled in the art that the last examples only indicated the basic estimation for the maximum expected Doppler frequency shift and maximum expected delay. Obviously other communication relevant parameters can also be used to improve the accuracy of the maximum expected Doppler frequency shift and the maximum expected delay. These two values are always optimized for the purpose of minimizing the two-dimensional guard interval surrounding the single pilot tone of the pilot symbol in the delay-Doppler domain grid in which the transmission symbols are arranged.

REFERENCE NUMERALS 10 frame
20 transmitter symbol
21 pilot
25 guard symbols
27 data symbols
30 grid
31 time basis
32 delay dimension
33 time interval
35 frequency basis
36 Doppler frequency shift dimension
37 frequency interval
40 two-dimensional guard interval
60 transportation vehicle (ego)
100 communication system
120 modulation module
140 transmitter (Tx)
150 status module
151 satellite navigation system
152 inertial navigation system
153 sensors
200 database
210 local database component
220 external database component
230 map data
240 telemetric data
250 received transmissions
300 modulation and signal generation unit
1000 retrieving status data for the transmitter (e.g., ego transportation vehicle)
1010 retrieve speed limit
1020 retrieve message type
1030 determine maximum relative speed
1040 determine maximum expected Doppler frequency shift
1050 determine maximum expected delay
1060 check for and verify against maximum reception Doppler frequency shift and/or maximum reception delay
1070 check for and verify against minimum Doppler frequency shift and/or minimum delay
1100 arrange transmitter symbols
1110 arrange pilot symbol
1120 arrange guard symbols
1130 arrange data symbols
1150 save maximum expected Doppler frequency shift and maximum expected delay to database
1160 iterate the actions

The invention claimed is:

1. A method for adaptive transmitter symbol arrangement in delay-Doppler domain grids sequentially transmitted using an Orthogonal Time Frequency Space Modulation with channel estimation,
wherein the delay-Doppler domain grids are two dimensional grids having a time-related delay dimension associated with a time basis and the other frequency-related Doppler dimension associated with a frequency basis, and wherein the transmitter symbols comprise at least one pilot symbol, guard symbols and data symbols,
the method comprising:

retrieving one or more current communication relevant parameters;

deriving, from the one or more current communication relevant parameters, at least:

a maximum expected Doppler frequency shift for a transmitted signal and wherein a first guard space parameter is equal to twice the absolute value of the maximum expected Doppler frequency shift; and a maximum expected time delay for a transmitted signal as a second guard space parameter;

placing at least one pilot symbol in a delay-Doppler domain grid;

placing a minimum number of guard symbols around the at least one pilot symbol in the delay-Doppler domain grid such that the guard symbols occupy a guard space around the at least one pilot so any grid position outside the guard space around the at least one pilot has a distance along the first grid direction exceeding the derived first guard space parameter and also has a distance along the second grid direction that exceeds the second guard space parameter; and placing data symbols in the delay-Doppler domain grid outside the guard space for data transmission, wherein the method operations are iteratively carried out to adapt the minimum required number of guard symbols around the at least one pilot symbol.

2. The method of claim 1, wherein retrieving the one or more current communication relevant parameters comprises receiving or determining the velocity or speed of the transmitter and receiving or determining the velocity or speed of a receiver and wherein the maximum expected Doppler frequency shift is derived based on the transmitter velocity or speed as well as the receiver velocity or speed.

3. The method of claim 1, wherein retrieving the one or more current communication relevant parameters comprises retrieving data from a database selected out of the group comprising:

speed limits, minimum expected Doppler frequency shifts, minimum expected delays, Map data, telemetric data of surrounding transportation vehicles, wherein the data in the database are correlated with a location.

4. The method of claim 3, wherein the retrieving of data from the database comprises the retrieving the minimum expected Doppler frequency shift and/or the minimum expected delay and wherein the maximum expected Doppler frequency shift is determined to at least equal the retrieved minimum expected Doppler frequency shift and/or the maximum expected delay is determined to at least equal the retrieved minimum expected delay.

5. The method of claim 1, wherein the communication relevant parameters comprises retrieving a communication class and wherein the scheme for determining the maximum expected Doppler frequency shift is determined based on the retrieved communication class.

6. The method of claim 1, wherein retrieving the one or more current communication relevant parameters comprises determining or receiving a transmission geometry information indicating whether the transmission will be a line-of-sight or a non-line-of-sight transmission and wherein the minimum expected delay is increased for a non-line-of-sight transmission.

7. The method of claim 1, wherein the transmission geometry is derived from map information in combination with the position of the transmitter and/or the position of the receiver.

8. The method of claim 1, wherein retrieving the one or more current communication relevant parameters comprises deriving or receiving a message class for the message to be communicated by transmitting the delay-Doppler domain grids, wherein the scheme to determine the maximum relative speed or velocity to determine the maximum expected Doppler frequency shift is chosen dependent on the message class.

9. The method of claim 1, wherein retrieving the one or more current communication relevant parameters comprises deriving a reception delay and/or a reception Doppler frequency shift from one or more received messages and wherein the maximum expected Doppler frequency shift is determined to at least equal the reception Doppler frequency shift and/or the maximum expected delay is determined to at least equal the reception delay.

10. The method of claim 1, wherein information about the grid positions actually used for arranging the guard symbols and/or about the grid positions actually used for arranging data symbols are provided to a communication control module modulating information into data symbols.

11. The method of claim 1, wherein the information about the grid positions actually used for arranging the guard symbols and/or about the grid positions actually used for arranging data symbols are coded into one or more of the data symbols arranged in the placement of data symbols in the delay-Doppler domain grid outside the guard space for data transmission in the current delay-Doppler domain grid.

12. A modulation module of a transmitter configured to adaptively arrange transmitter symbols in delay-Doppler domain grids sequentially transmitted using the Orthogonal Time Frequency Space Modulation with channel estimation, wherein:

the delay-Doppler domain grids are two dimensional grids having a time-related delay dimension associated with a time basis and the other frequency-related Doppler dimension associated with a frequency basis, the transmitter symbols comprise at least one pilot symbol, guard symbols and data symbols, and the modulation module is configured to:

retrieve one or more current communication relevant parameters;

derive, from the one or more current communication relevant parameters, at least:

a maximum expected Doppler frequency shift for a transmitted signal and wherein a first guard space parameter is equal to twice the absolute value of the maximum expected Doppler frequency shift; and a maximum expected time delay for a transmitted signal as a second guard space parameter;

place at least one pilot symbol in a delay-Doppler domain grid;

place a minimum number of guard symbols around the at least one pilot symbol in the delay-Doppler domain grid such that the guard symbols occupy a guard space around the at least one pilot so any grid position outside the guard space around the at least one pilot has a distance along the first grid direction exceeding the derived first guard space parameter and also has a distance along the second grid direction that exceeds the second guard space parameter; and place data symbols in the delay-Doppler domain grid outside the guard space for data transmission, wherein the modulation module operations are iteratively carried out to adapt the minimum required number of guard symbols around the at least one pilot symbol.

13. The modulation module of claim 12, wherein retrieving the one or more current communication relevant parameters comprises receiving or determining the velocity or speed of the transmitter and receiving or determining the velocity or speed of a receiver and wherein the maximum expected Doppler frequency shift is derived based on the transmitter velocity or speed as well as the receiver velocity or speed.

14. The modulation module of claim 12, wherein retrieval of the one or more current communication relevant parameters comprises retrieving data from a database selected out of the group comprising:

speed limits, minimum expected Doppler frequency shifts, minimum expected delays, Map data, telemetric data of surrounding transportation vehicles, wherein the data in the database are correlated with a location.

15. The modulation module of claim 14, wherein the retrieval of data from the database comprises the retrieval of the minimum expected Doppler frequency shift and/or the minimum expected delay and wherein the maximum expected Doppler frequency shift is determined to at least equal the retrieved minimum expected Doppler frequency shift and/or the maximum expected delay is determined to at least equal the retrieved minimum expected delay.

16. The modulation module of claim 12, wherein the communication relevant parameters comprises retrieving a communication class and wherein the scheme for determining the maximum expected Doppler frequency shift is determined based on the retrieved communication class.

17. The modulation module of claim 12, wherein retrieving the one or more current communication relevant parameters comprises determining or receiving a transmission geometry information indicating whether the transmission will be a line-of-sight or a non-line-of-sight transmission and wherein the minimum expected delay is increased for a non-line-of-sight transmission.

18. The modulation module of claim 12, wherein the transmission geometry is derived from map information in combination with the position of the transmitter and/or the position of the receiver.

19. The modulation module of claim 12, wherein retrieving the one or more current communication relevant parameters comprises deriving or receiving a message class for the message to be communicated by transmitting the delay-Doppler domain grids, wherein the scheme to determine the maximum relative speed or velocity to determine the maximum expected Doppler frequency shift is chosen dependent on the message class.

20. The modulation module of claim 12, wherein retrieving the one or more current communication relevant parameters comprises deriving a reception delay and/or a reception Doppler frequency shift from one or more received messages and wherein the maximum expected Doppler frequency shift is determined to at least equal the reception Doppler frequency shift and/or the maximum expected delay is determined to at least equal the reception delay.

21. The modulation module of claim 12, wherein information about the grid positions actually used for arranging the guard symbols and/or about the grid positions actually used for arranging data symbols are provided to a communication control module modulating information into data symbols.

22. The modulation module of claim 12, wherein the information about the grid positions actually used for arranging the guard symbols and/or about the grid positions actually used for arranging data symbols are coded into one or more of the data symbols arranged in the placement of data symbols in the delay-Doppler domain grid outside the guard space for data transmission in the current delay-Doppler domain grid.

* * * * *